UNITED STATES PATENT OFFICE.

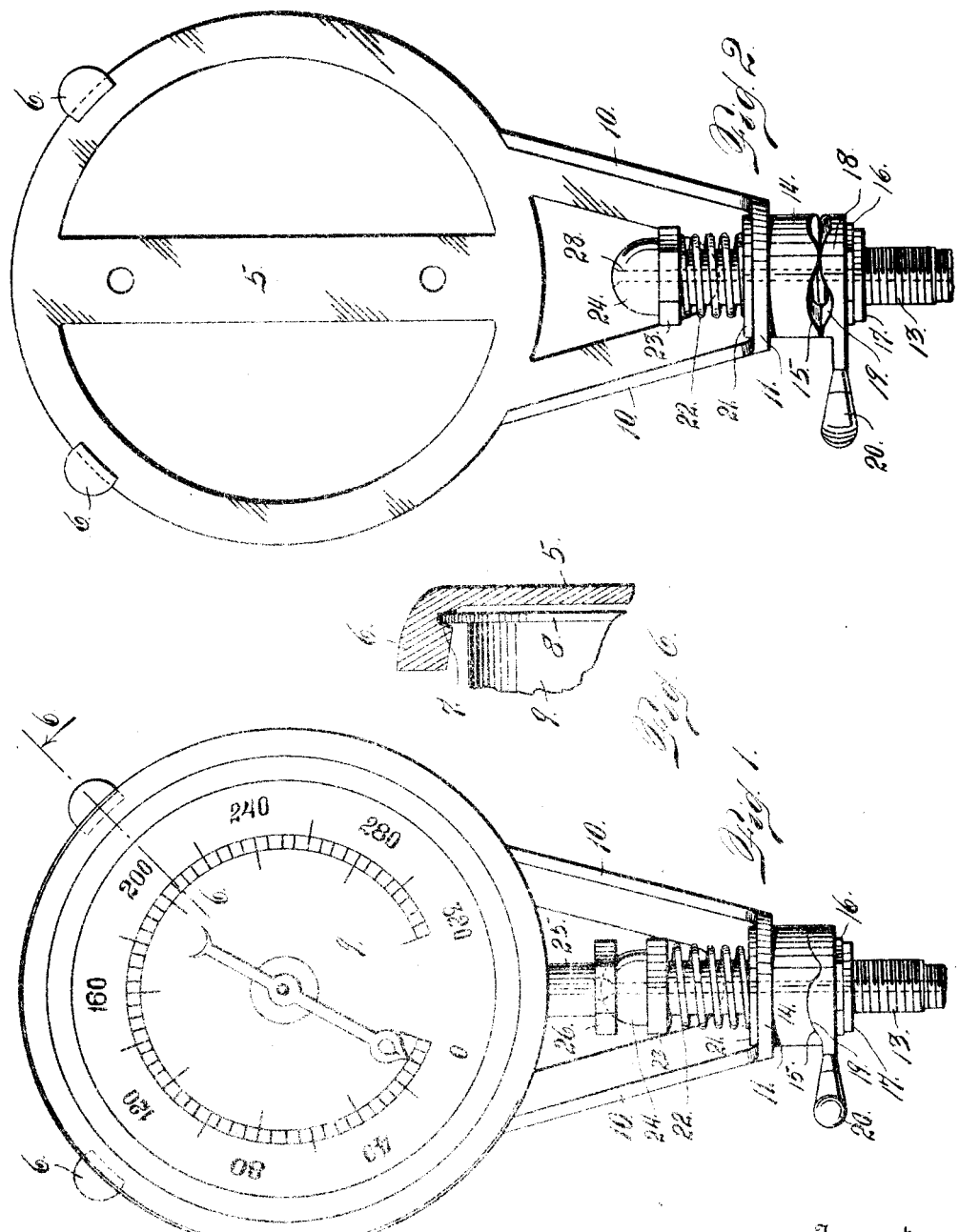

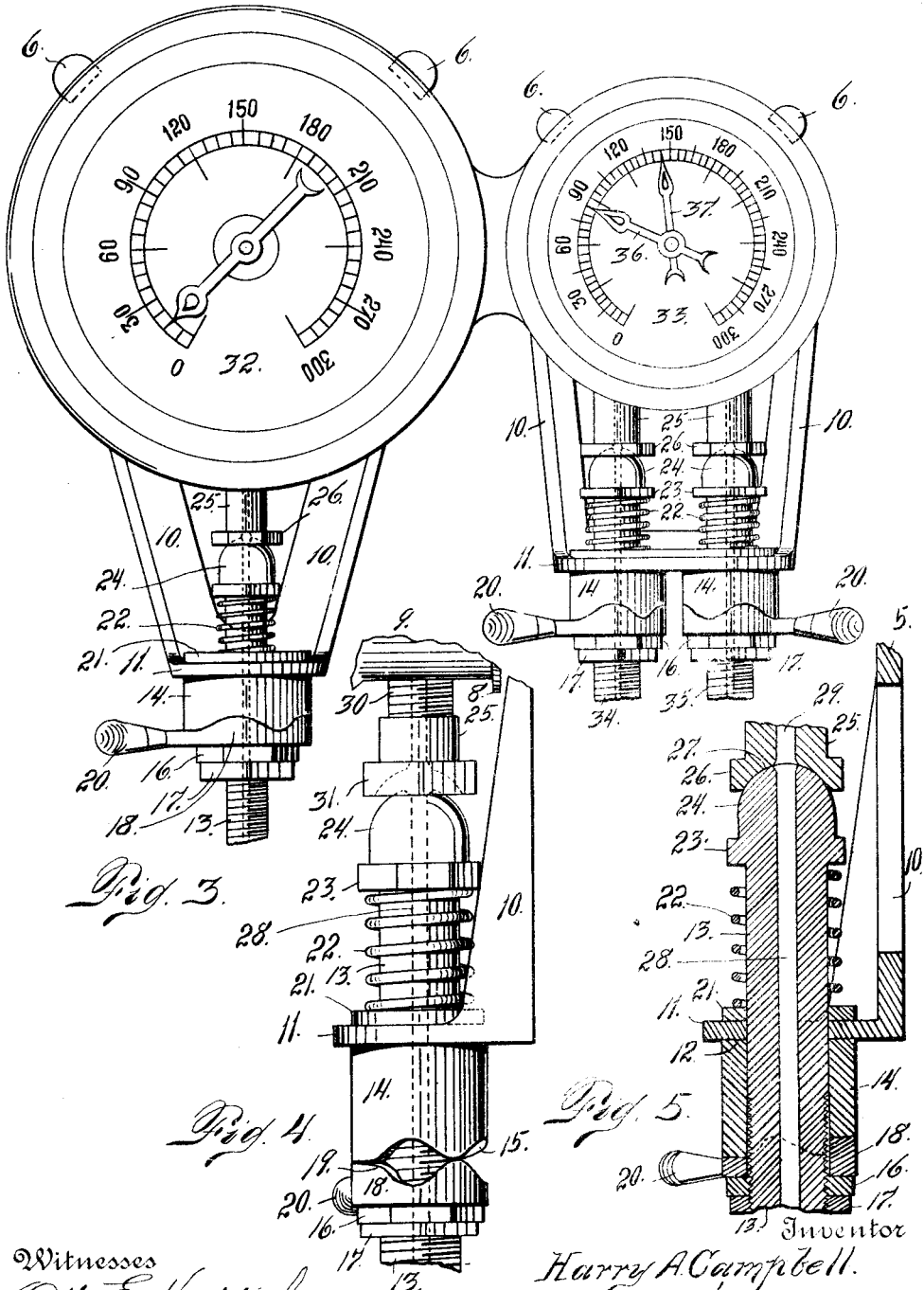

HARRY A. CAMPBELL, OF DENVER, COLORADO.

GAGE HOLDER AND CONNECTION.

1,108,065.      Specification of Letters Patent.      Patented Aug. 18, 1914.

Application filed January 13, 1913. Serial No. 741,750.

*To all whom it may concern:*

Be it known that I, HARRY A. CAMPBELL, a subject of the King of Great Britain, residing in the city and county of Denver and State of Colorado, have invented certain new and useful Improvements in Gage Holders and Connections; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to holders and connections for fluid gages being more especially intended for use in locomotives.

One object of my invention is to provide means for simultaneously locking the gage in place upon the gage holder and making the connection with the fluid pipe, the two results being accomplished by the operation of a single lever.

Another object is to provide means for regulating the tension of the spring which maintains the fluid connection.

Other objects will appear hereinafter as I proceed with the description of that embodiment of the invention, which, for the purpose of the present application is illustrated in the accompanying drawings in which:

Figure 1 is a front elevation of the gage holder with the gage in place thereon. Fig. 2 is a similar view with the gage removed. Fig. 3 is a front elevational view of a double gage holder with gages in place thereon. Fig. 4 is a fragmental edge view of the lower portion of a modification of my invention. Fig. 5 is a central vertical sectional view of the same, the section being at right angles to the face of the gage. Fig. 6 is a detail partly in cross section upon the line 6—6 Fig. 1.

Similar reference characters refer to like parts in all of the views.

Referring particularly to the device as shown in Figs. 1 and 2, 5 represents the flat frame portion of a gage holder having forwardly projecting fingers 6 provided at 7 with grooves for the reception of a flange 8 upon the rear of a gage 9. Depending from the portion 5 are angular arms 10 which support a small horizontal platform 11 perforated at 12 to receive loosely a fluid pipe 13, the latter also passing loosely through a sleeve 14 which is secured to and extends downwardly from the platform 11, said sleeve 14 having a wave-shaped cam surface 15 at its lower extremity.

Supported on the pipe 13 by means of a nut 16 and a locking nut 17 is a sleeve 18 equal in diameter to the sleeve 14 and provided with an upper cam surface 19 which is adapted to interfit with the cam surface 15 of the sleeve 14 as shown in Fig. 1. The sleeve 18 is fitted with a lever or handle 20 by means of which it may be rotated in order to cause the cam surfaces 15 and 19 to ride upon each other and the pipe 13 to be thereby pulled downwardly.

A washer 21 lies upon the platform 11 about the pipe 13 and forms one abutment for a coil spring 22 the opposite abutment of which is a shoulder 23 integral with the pipe 13, the latter being formed above the shoulder 23 with a rounded or ball head 24.

Extending downwardly from the lower edge of the gage 9 is a pipe connection 25 provided at its lower extremity with an enlargement or shoulder 26 which is cut away upon its under surface to form a socket 27 of spherical contour. The pipe 13 and the pipe connection 25 are centrally bored whereby alining passages 28 and 29 are supplied through which the fluid enters the gage.

In Fig. 4 I have illustrated a slight modification in the pipe connection whereby I am enabled to compensate for any adjustment in the tension of the spring by means of the nuts 16 and 17 that may be necessary. To this end I provide the gage with a depending screw-threaded pipe 30 upon which is threaded a sleeve or nut 31 having a socket and perforation similar to those of the pipe connection 25. Rotation of sleeve or nut 31 to the right or left will, of course, cause it to move upwardly or downwardly, respectively.

In Fig. 3 I have illustrated the application of my invention to a double gage, one part of which is adapted to measure the pressure in two different fluid bodies. This figure illustrates a common arrangement on locomotives, the large gage 32 at the left being the steam gage while the smaller one 33 at the right is the gage for the air in the air-brake system. With the gage 33 is connected a pipe 34 leading to the train line pipe (not illustrated) and a pipe 35 leading to the main air reservoir (not illustrated). Hands 36 and 37 indicate the pressure of the fluids in the pipes 34 and 35, respectively. The mechanism for shifting the pipes 34 and 35, being precisely similar to that for shifting the pipe 13, further description will be unnecessary.

From the foregoing, the operation of my improved gage holder and pipe connector will be obvious. When it is desired to put a gage in place, the handle 20 or (as in the case of the connection shown in Fig. 3) the handles 20 are rotated, causing the cam surfaces 15 and 19 to ride upon each other until their highest points are in contact whereby the pipe 13 or pipes 13, 34, and 35, as the case may be, are pulled downwardly against the action of the spring or springs 22. The gage will then be placed in position with its back rim 8 in the grooves 7 of the fingers 6 and its lower pipe connection or connections will be caused to ride over the rounded head or heads 24 of the fluid pipe or pipes. The gage being in place, the sleeve or sleeves 18 are permitted to rotate into their normal positions as illustrated in Figs. 1, 3 and 5, whereupon the gage is locked in place and the pipe connections made tight by the pressure of the springs 22. In removing a gage the reverse of these operations is followed.

I claim as my invention:

1. The combination with a gage holder comprising a frame having forwardly extending fingers adapted to engage the rim of a gage and an oppositely located ball headed pipe spring pressed toward said fingers of a gage, and a pipe connection extending outwardly from one side of said gage, said pipe connection having a socket in its outer extremity adapted to being engaged by the ball headed pipe.

2. In combination, a gage, an outwardly extending pipe connection thereupon, a gage holder, a pipe longitudinally slidable therein, the adjacent extremities of said pipe connection and pipe being adapted to engage and form a tight joint, resilient means acting upon said pipe to maintain said joint, means upon the gage holder opposite the pipe for engaging said gage and means for retracting said pipe against the action of the resilient means.

3. In combination, a gage holder, a pipe mounted thereon to be capable of slight longitudinal reciprocation, a gage having an outwardly extending screw-threaded pipe provided with a socket at its outer extremity to receive the adjacent end of said reciprocable pipe, and resilient means acting on said reciprocable pipe to hold it in engagement with said socket, the socket extremity of the pipe connected with the gage, being adjustable to regulate the tension of said resilient means.

4. In combination, a gage holder, a pipe mounted thereupon to be capable of slight longitudinal reciprocation, a gage having a connection adapted to register with said pipe in one position, resilient means for maintaining the pipe in the latter position, a cam mounted upon said pipe, a cam mounted upon said gage holder in a position to be engaged by the first named cam and means whereby said first named cam may be adjusted longitudinally of the pipe.

In testimony whereof I affix my signature in presence of two witnesses.

HARRY A. CAMPBELL.

Witnesses:
  A. J. O'BRIEN,
  IVA E. DOLAN.